Patented Oct. 3, 1950

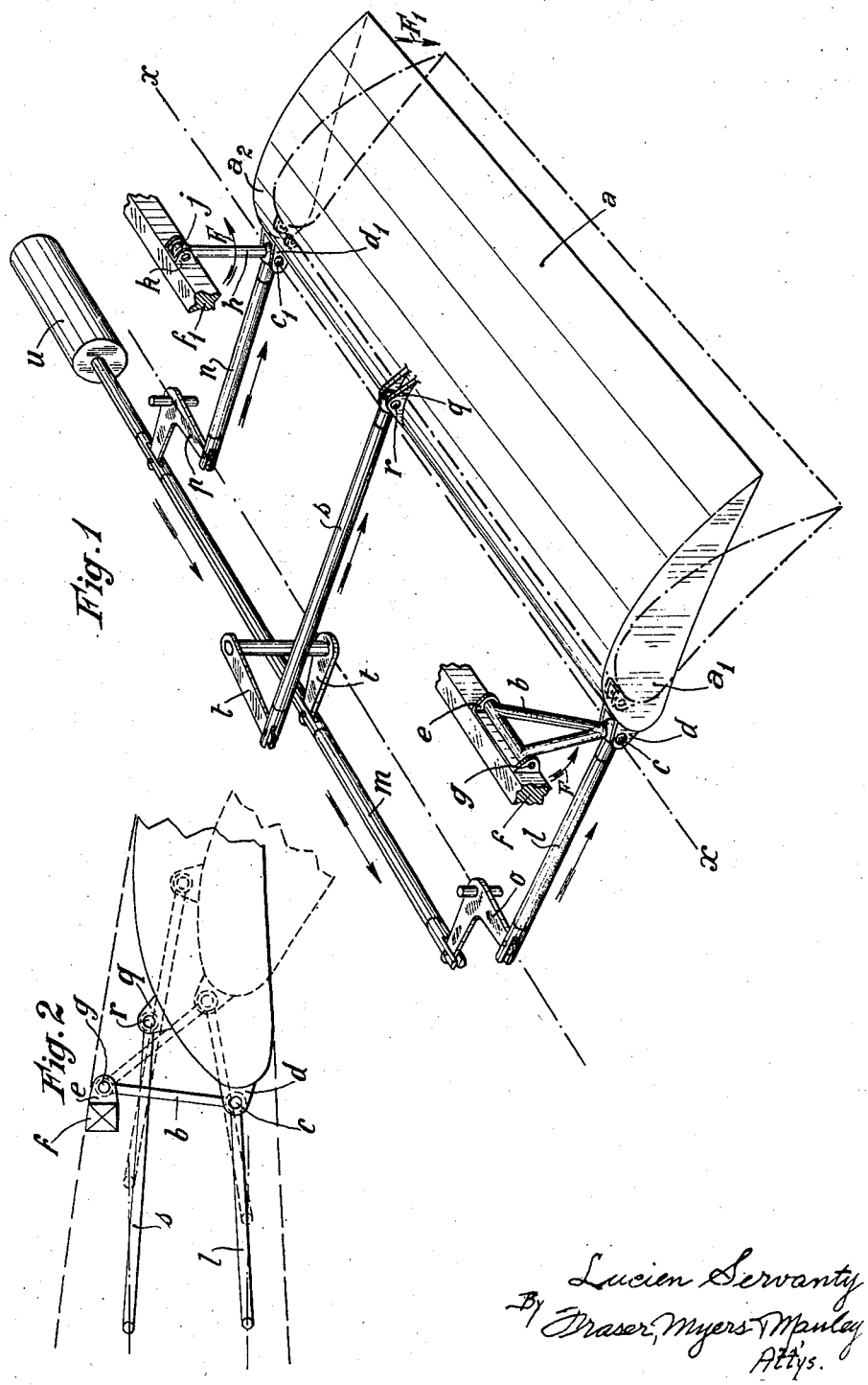

2,524,605

UNITED STATES PATENT OFFICE 2,524,605

ARRANGEMENT FOR SECURING AND CONTROLLING A MOVABLE FLAP AT THE TRAILING EDGE OF AN AIRPLANE WING

Lucien Servanty, Paris, France, assignor to Societe Nationale de Constructions Aeronautiques du Sud-Ouest (Societe Anonyme), Paris, France, a company of France Application May 15, 1945, Serial No. 593,818
In France November 23, 1944

1 Claim. (Cl. 244—42)

The present invention has for its object an arrangement for securing and controlling a movable flap at the trailing edge of an airplane wing, said arrangement being particularly applicable when the flap is to execute during its movements a substantial rearward motion with reference to the wing while at the same time as its angular position is changed.

Heretofore this movement of the flap was generally obtained through the pivotal motion of the flap round a hinge located at a substantial distance underneath the lower surface of the aerofoil section; now the presence of constructional elements such as hinges, levers and the like on the outside of the aerofoil section defined by the wing itself has as a consequence the production of an undesirable parasitical drag.

According to the invention, the flap is carried by the wing through the agency of links which produce its rearward motion through a suitable control while a flap-turning connecting rod controlled by the same control and engaging the flap at a point located outside the suspension axis of the latter has a tendency to make said point move backwards through a different amount, which constrains the flap to pivot round said axis. The flap thus accomplishes the desired movement, to wit the combination of a translational and a rotational movement.

According to a form of execution of this securing and controlling arrangement, the control is constituted by a sliding bar parallel with the suspension axis through which the flap is secured and cooperating with connecting rods pivotally secured to points of the suspension axis of the flap and with the above mentioned flap-turning connecting rod and bell cranks transmitting the movement of the sliding bar to the different connecting rods with a different transformation ratio for the flap-turning connecting bar.

The flap-turning connecting rod and all the flap-securing links except one are preferably pivotally secured through ball and socket joints at their two ends while one of the securing links is provided with such a ball and socket joint only on the flap side while its other end is pivoted to the wing through an axis parallel to the suspension line.

Such an arrangement shows the following advantages:

1. The possibility of giving the flap on the trailing edge the desired rearward and rotational movements without any element of the structure appearing normally outside the aerofoil section, which leads to a substantial reduction of the parasitical drag.

2. The introduction of lever arms longer than those of any similar known device, this lengthening of the lever arm leading to a greater rigidity of the whole arrangement together with a lesser action on the steadfastness of the flap as there exists an unavoidable play between the links of the arrangement.

3. A reduction to a minimum of the number of links of the arrangement.

4. The possibility of applying the arrangement to any wings and flaps whatever their horizontal outline and section may be, while retaining a great smoothness in operation as any wedging becomes impossible by reason of the manner of securing the flap through three points.

5. An increased ease in building and a greater possibility of interchanging the parts, the number of points to which the flap is secured and the number of degrees of freedom of each element used for securing the flap being such that the correct mounting and operation of the arrangement remain always possible in spite of the unavoidable differences in manufacture.

The following description and accompanying drawings given solely by way of example and by no means in a limitative sense will render the invention to be well understood; the particular features appearing in the drawing and in the description forming of course part of said invention.

Fig. 1 is a diagrammatic perspective view of the mounting of a flap movable in accordance with the invention.

Fig. 2 is an end view of Fig. 1.

The flap or flap element $a$ near one of its ends $a_1$ has connected thereto a link $b$ of constant or adjustable length through the agency of a ball or socket joint $c$ mounted in the bracket $d$ secured at a suitably chosen point, preferably in close proximity with the extreme lower front part of the flap. This link is pivotally secured in turn to the bracket $e$ of suitable width secured to the wing element $f$; the link $b$ is secured to said bracket $e$ through an axis $g$, the direction of which is substantially parallel to the span of the wing whereby the link $b$ extends approximately perpendicular to the plane of the chord of the wing.

In the vicinity of its other end $a_2$, the flap $a$ has connected thereto the link $h$, also of constant or adjustable length by means of a ball and socket joint $c_1$ and the bracket $d_1$, which elements are similar or identical as to their constitution and location with those existing at the other end of the flap.

This link $h$ is pivotally secured through the agency of a ball and socket joint $j$ and bracket $k$ to a structural element $f_1$ of the wing chosen in a manner such that the link $h$ assumes with reference to the cross-section of the flap a position substantially similar to that of the link $b$.

The links $b$ and $h$ are capable of pivotal movement in the direction of the arrows F under the action of the translational movement of the control bar $m$ parallel with the suspension axis $xx$ of the flap passing through $c$ and $c_1$. This bar $m$ is connected through identical bell cranks $o$ and $p$ with two parallel connecting rods $l$ and $n$ which are pivotally secured to the links $b$ and $h$ at $c$ and $c_1$ respectively.

Any control device $u$ constituted by an electric motor, a jack or hand controlled means produces the desired displacement of the bar $m$ either directly or through the agency of any transmission means.

A bracket $q$ secured to the flap in any cross section thereof and through a point suitably chosen in the vicinity of the upper surface of the wing above the suspension line $xx$ passing through the ball and socket joints $c$—$c_1$, is assembled through a ball and socket joint $r$ wtih a connecting rod $s$ which is secured at its other end, also through a ball and socket joint, to a bell crank $t$ controlled by the bar $m$. This bell crank $t$ is not identical with the bell cranks $o$ and $p$; its transformation ratio of the movement is such that for a same sliding motion of the bar $m$ the connecting rod $s$ produces a displacement of the joint $r$ which is greater than those performed by the joints $c$ and $c_1$ under the action of the connecting rods $l$ and $n$. If, for instance, the pivotal axes of the three bell cranks $o$, $p$ and $t$ are alined, as shown in the case illustrated in the drawing, the arm of the bell crank $t$ which is pivoted to the connecting rod $s$ should be longer than the corresponding arms of the bell cranks $o$ and $p$.

The operation of the arrangement becomes thus obvious. The displacement of the connecting bar $m$ in the direction of the arrows parallel thereto leads to the rearward motion of the brackets $d$ and $d_1$ and to a more marked rearward motion of the bracket $q$; the flap $a$ moves therefore backwards together with the brackets $d$ and $d_1$ while the more marked rearward motion of the bracket $q$ leads to a pivoting of the flap round the imaginary hinge constituted by the straight line $x$—$x$.

The vertical stresses applied to the flap are absorbed chiefly by the links $b$ and $h$; the horizontal stresses directed from front to rear or reversely and the rotational torque the axis of which is substantially parallel with the span are chiefly absorbed by the connecting rods $l$, $n$ and $s$.

The lateral position of the flap is determined by the link $b$, the width of the portion thereof which is secured to the wing being sufficient to support the component of the horizontal stresses which is substantially parallel to the span of the flap.

Obviously without widening the scope of the invention, it is possible to bring various modifications in the form of execution which has just been described. In particular the means used for controlling and associating the links $b$ and $h$ and the connecting rod $s$ may be executed in any suitable manner. Moreover, the position of each of the brackets $d$, $d_1$, $e$, $q$ and $k$ may be chosen in accordance with the shape of the flap and of the wing and the movement which it is desired to obtain, said brackets being even located, in the case of certain applications, outside the contour defined by the aerofoil section.

What I claim is:

The combination with an aircraft wing, of a movable flap located at the trailing edge of the wing and having its forward portion normally nesting in the trailing portion of the wing, a pair of spanwise spaced links connecting the flap to the wing in suspended relation, said links at their lower ends being connected by universal joints to the flap, one of said link connections with the wing being a hinge joint the axis of which is parallel to the leading edge of the flap and the other of said link connections with the wing being a universal joint the center of which lies in the axis of the hinge joint, both links being arranged to move wholly within the aerofoil rear tip portion of the wing, a flap turning connecting rod within the wing disposed between said links and movable in a fore and aft direction, one end of said connecting rod being connected by a universal joint to the flap at a point above and to the rear of the pivotal axis of the connections between the links and the flap, additional connecting rods within said wing, each of said connecting rods having one end connected to one of the universal joints between one of said links and the flap and means within the wing for simultaneously moving all of the connecting rods in a direction fore and aft of the wing to move the flap in a curved path fore and aft relatively to the wing.

LUCIEN SERVANTY.

REFERENCES CITED

The following references are of record in the file of this patent:

UNITED STATES PATENTS

| Number | Name | Date |
|---|---|---|
| 2,137,879 | Ksoll | Nov. 22, 1938 |
| 2,158,676 | Engelhardt | May 16, 1939 |
| 2,194,796 | Joyce | Mar. 26, 1940 |
| 2,202,430 | Rebeski | May 28, 1940 |
| 2,352,074 | Brown | June 20, 1944 |
| 2,373,365 | Westberg | Apr. 10, 1945 |

FOREIGN PATENTS

| Number | Country | Date |
|---|---|---|
| 486,565 | Great Britain | June 7, 1938 |
| 558,047 | Great Britain | Dec. 16, 1943 |